(12) United States Patent
Osburn

(10) Patent No.: US 8,183,841 B2
(45) Date of Patent: May 22, 2012

(54) MULTI-PHASE POWER SUPPLY CONTROLLER AND METHOD THEREFOR

(75) Inventor: Edward P. Osburn, Tigard, OR (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 585 days.

(21) Appl. No.: 11/970,326

(22) Filed: Jan. 7, 2008

(65) Prior Publication Data

US 2009/0174389 A1 Jul. 9, 2009

(51) Int. Cl.
*G05F 1/613* (2006.01)
(52) U.S. Cl. ......................... 323/272; 323/351
(58) Field of Classification Search .................. 323/272, 323/350–351; 307/58, 59, 87; 363/65
See application file for complete search history.

(56) References Cited

U.S. PATENT DOCUMENTS

| | | | |
|---|---|---|---|
| 6,281,666 B1 * | 8/2001 | Tressler et al. | 323/272 |
| 6,674,274 B2 * | 1/2004 | Hobrecht et al. | 323/285 |
| 7,002,325 B2 * | 2/2006 | Harris et al. | 323/272 |
| 7,999,520 B2 * | 8/2011 | Luo et al. | 323/267 |
| 2005/0127886 A1 * | 6/2005 | Sase et al. | 323/282 |
| 2006/0075270 A1 * | 4/2006 | Seo | 713/320 |
| 2006/0139016 A1 * | 6/2006 | Schuellein et al. | 323/272 |
| 2007/0188219 A1 * | 8/2007 | Segarra | 330/2 |

OTHER PUBLICATIONS

Intel, Core2 Extreme Processor QX9650 Datasheet, Nov. 2007, Document Number: 318726-001.

* cited by examiner

*Primary Examiner* — Harry Behm
(74) *Attorney, Agent, or Firm* — Robert P. Hightower

(57) ABSTRACT

In one embodiment, a multi-phase power supply controller is configured to an operating status signal and responsively inhibit the PWM controller from forming at least one PWM drive signal of a plurality of PWM drive signals.

18 Claims, 3 Drawing Sheets

US 8,183,841 B2

MULTI-PHASE POWER SUPPLY CONTROLLER AND METHOD THEREFOR

BACKGROUND OF THE INVENTION

The present invention relates, in general, to electronics, and more particularly, to methods of forming semiconductor devices and structure.

In the past, the electronics industry utilized various methods and structures to form power supply controllers for computational systems such as computer systems and microprocessor systems. Many prior computational systems utilized INTEL microprocessors or other similar microprocessors as the computational element of the computational system. These prior computational systems often required that the power supply controller that supplied operating power to the computing element have the capability to adjust the value of the output voltage from the power supply controller. However, these changes in the output voltage did not typically lower the amount of power utilized by the computational system. With the increasing need to reduce power consumption and improve efficiency, it is desirable to provide power supply controllers that have greater efficiency than that provided by these prior power supply controllers.

Accordingly, it is desirable to have a power supply controller for a computational system that has improved efficiency.

For simplicity and clarity of the illustration, elements in the figures are not necessarily to scale, and the same reference numbers in different figures denote the same elements. Additionally, descriptions and details of well-known steps and elements are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to about ten per cent (10%) are regarded as reasonable variances from the ideal goal of exactly as described.

DETAILED DESCRIPTION OF THE DRAWINGS

Figure 1:
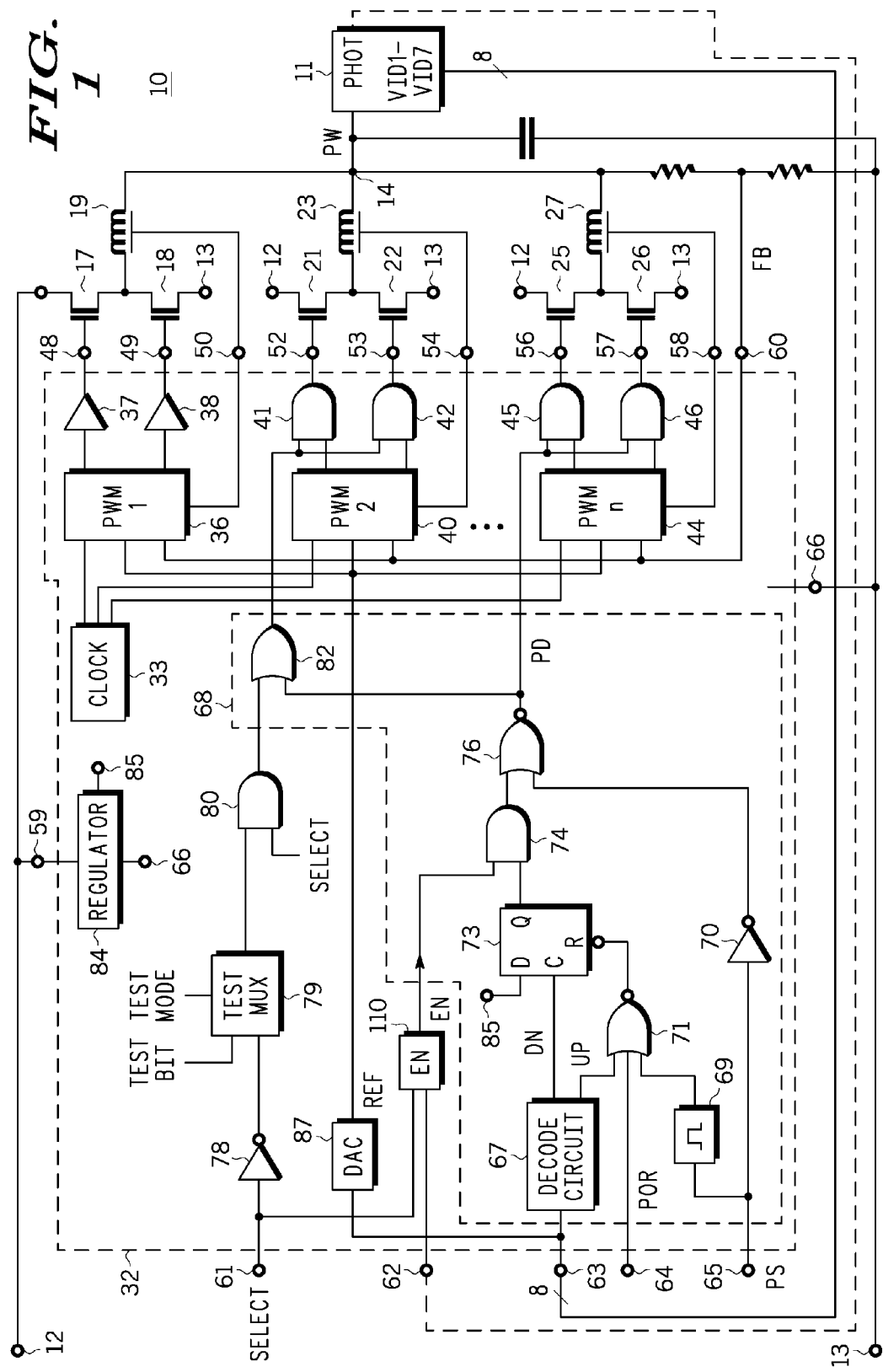
FIG. 1 schematically illustrates an embodiment of a portion of a computational system that includes an exemplary embodiment of an efficient power supply controller in accordance with the present invention.

FIG. 1 schematically illustrates an embodiment of a portion of a computational system 10 that includes an exemplary embodiment of an efficient power supply controller 32. System 10 receives an input voltage and current between an input terminal 12 and a return terminal 13 and provides a substantially regulated output voltage between a voltage output 14 and return terminal 13. A computational element, such as a microcomputer or a microprocessor (processor) 11, is connected between output 14 and return terminal 13 in order to receive the output voltage as an operating voltage for operating processor 11. For clarity of the drawings, the connection to return 13 is not shown in FIG. 1. As is well known to those skilled in the art, computational system 10 may include other computational elements that are connected to processor 11, such as bus controllers, peripheral controllers, etc., in order to form a complete computational system.

In the preferred embodiment, processor 11 is an INTEL microprocessor such as a PENTIUM, an INTEL CORE, an INTEL CORE Duo Processor, or other power type of microprocessor that has different power requirements for different operating states of the computational element. INTEL and INTEL CORE are registered trademarks of Intel corporation of San Jose, Calif. A power control element of system 10 includes power supply controller 32 and various other elements that typically are external to controller 32 and are used to generate and regulate the output voltage on output 14 to the desired value. Because of the varying power requirements, the control element includes a plurality of power control phases or channels that are utilized to regulate the output voltage. Each phase or channel typically includes a PWM control section that forms a PWM drive signal, an inductor, and a power switch that is driven by the PWM drive signal and switches the inductor to regulate the output voltage. The different phases or channels typically operate from a clock signal with each clock signal that is used by each PWM control section of each phase skewed or shifted relative to the clock of the other PWM control sections. Each clock signal usually is derived from and is synchronized to a common clock signal. Such multiphase PWM controllers are well known to those skilled in the art.

The exemplary embodiment of the power control element illustrated in FIG. 1, includes a pair of switch transistors 17 and 18 connected in a stacked configuration between terminals 12 and 13 and operated by PWM drive signals from a PWM control section of controller 32. Transistors 17 and 18 switch an inductor 19 that supplies voltage and current to output 14. A current sense element may be utilized to sense the current flow through inductor 19 and form a first current sense signal that is received by controller 32 on an input 50. For example, a resistor-capacitor filer (not shown) may be connected across inductor 19 to sense the current flow. Similarly, the second channel or second phase includes a pair of switch transistors 21 and 22 connected in a stacked configuration between terminals 12 and 13 that are operated by PWM drive signals from a second PWM control section of controller 32. Transistors 21 and 22 switch an inductor 23 that supplies voltage and current to output 14. Another current sense element may be utilized to sense the current flow through inductor 23 and form a second current sense signal that is received by controller 32 on an input 54. Controller 32 and the elements external to controller 32 may have any number (N) of phases or channels as illustrated by PWM control section N. Nth channel or phase includes a pair of switch transistors 25 and 26 connected in a stacked configuration between terminals 12 and 13 that are operated by PWM drive signals from the Nth PWM control section of controller 32. Transistors 25 and 26 switch an Nth inductor 27 that supplies voltage and current to output 14. An Nth current sense element may be utilized to sense the current flow through Nth inductor 27. The Nth current sense signal is received by the Nth PWM channel of controller 32 on an input 58. A feedback network, such as a resistor divider, forms a feedback (FB) signal that is representative of the value of the output voltage between output 14 and terminal 13. Controller 32 receives the FB signal on an input 60 and supplies the FB signal to each PWM control section. As is well known in the art, the FB signal is usually received by a differential amplifier or an error amplifier that includes some type of frequency compensation to provide a stable control loop.

Controller 32 includes a voltage input 59 and voltage return 66 that usually are connected to respective terminals 12 and 13 in order to receive power for operating controller 32. An internal regulator 84 is usually connected between input 59 and return 66 within controller 32 in order to receive the input voltage and provide an internal operating voltage on an output 85 that is utilized for operating elements of controller 32. Controller 32 usually includes a clock generator or clock 33 that is configured to form a plurality of clock signals for operating the plurality of PWM control sections of controller 32. Typically, each clock signal has the same fixed period; however, the period of each clock signal generally is skewed or shifted relative to the other clock signals so that each PWM control section asserts the corresponding PWM drive signal at different times. Such PWM control sections and clocks are well known to those skilled in the art. The first PWM control section includes a first PWM control circuit or first PWM circuit or controller 36 and PWM drivers 37 and 38. PWM controller 36 receives a first clock signal from clock 33, the first current sense signal from input 50, and the feedback (FB) signal and forms first PWM drive signals. Drivers 37 and 38 receive the PWM drive signals and form signals suitable for operating transistors 17 and 18 through outputs 48 and 49 of controller 32. Similarly, the second PWM control section includes a second PWM control circuit or second PWM circuit or controller 40 that receives a second clock signal from clock 33, the second current sense signal from input 54, and the FB signal and forms second PWM drive signals. AND gate drivers 41 and 42 function as drivers that receive the second PWM signals and provide drive signals for operating transistors 21 and 22 through outputs 52 and 53. The Nth PWM control channel includes an Nth PWM control circuit or Nth PWM circuit or controller 44 that receives the Nth clock signal from clock 33, the Nth current sense signal from input 58, and the FB signal and forms Nth PWM drive signals. AND gate drivers 45 and 46 receive the Nth PWM drive signals and function as drivers to provide drive signals for operating transistors 25 and 26 through outputs 56 and 57. As will be seen further hereinafter, controller 32 may include an optional power save input 65 that may be utilized to receive a power save input control (PS) signal and force controller 32 to inhibit forming at least one PWM drive signal. An optional phase select input or select input 61 of controller 32 may be used to control the number of PWM channels that remain operating under certain conditions as will be seen further hereinafter.

Figure 2:
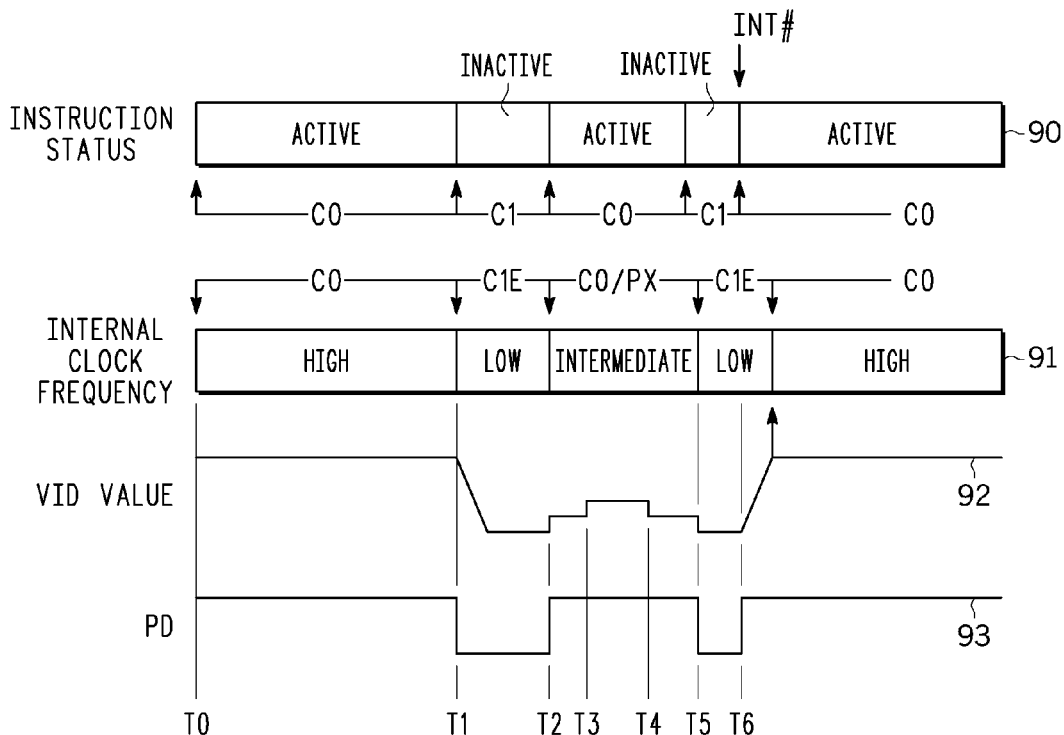
FIG. 2 graphically illustrates various states of the computational system and signals within the computational system of FIG. 1 in accordance with the present invention.

FIG. 2 is a diagram that graphically illustrates an interrelationship between the internal execution of instructions by processor 11, the internal clock frequency of processor 11, and other signals of system 10. A bar graph 90 illustrates the status of instructions that are being internally executed by processor 11, and a bar graph 91 illustrates the relative frequency of the internal clock of processor 11 during the operation of the instructions illustrated in bar graph 90. The designation PX in plot 91 represents one variable power state of the X number of variable power states in which processor 11 may operate. A plot 92 illustrates the value of a plurality of voltage identification (VID) signals generated by processor 11, and a plot 93 illustrates the state of a phase disable (PD) control signal of controller 32.

Figure 3:
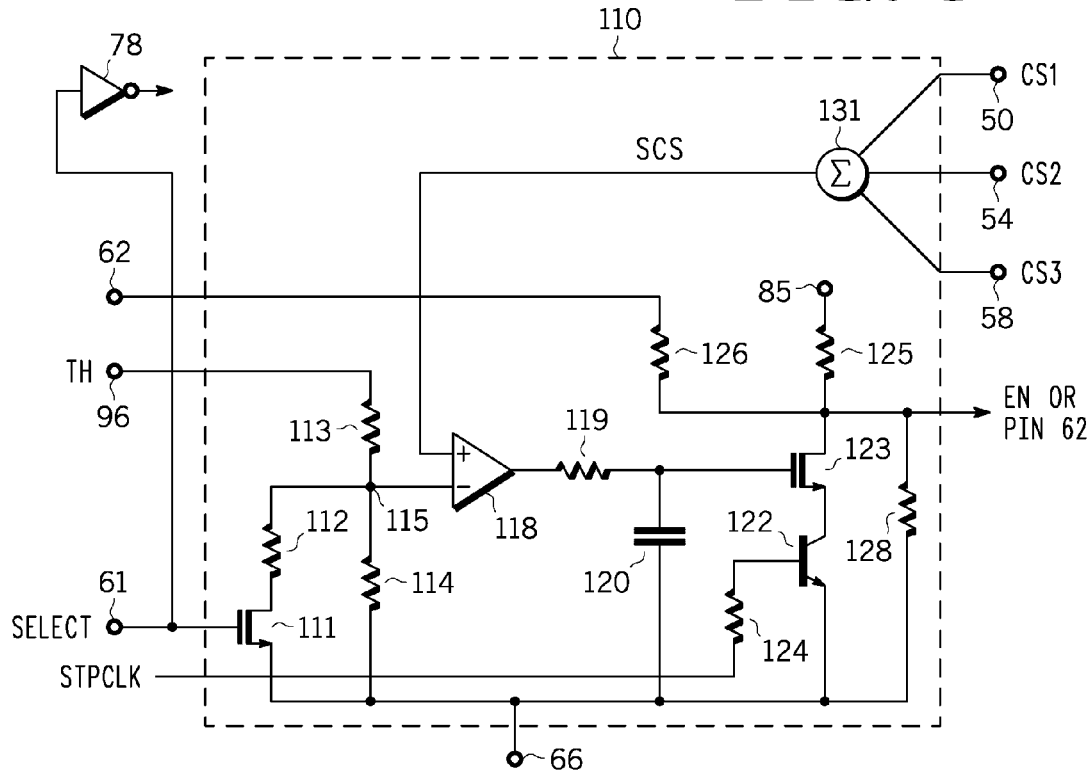
FIG. 3 schematically illustrates an exemplary embodiment of an optional circuit of the efficient power supply controller of FIG. 1 in accordance with the present invention.

FIG. 3 schematically illustrates an exemplary embodiment of an optional Enable control circuit or EN circuit 110 of controller 32. Circuit 110 includes a summing circuit 131, a comparator 118, transistors 111 and 123, capacitor 120, resistors 112-115, 119, 125-126, and 128. Optional transistor 122 and resistor 124 may be included in some optional embodiments. This description has references to FIG. 1, FIG. 2, and FIG. 3. Those skilled in the art will understand that processor 11 has different operating states and power requirements that depend on the type of instructions that are being executed internally to processor 11. Since MOS transistors usually have a lower propagation at higher voltage levels, processor 11 generally includes a plurality of voltage identification (VID) signals and outputs (such as VID signals and outputs identified in FIG. 1 as VID1-VID7) that are used to request that the power control system supply processor 11 with a certain values of the output voltage in order to assist in rapidly executing the instructions. The VID signals indicate the voltage requirement for processor 11, thus, they may be regarded as voltage requirement signals. For example, when processor 11 is executing instructions that require processor 11 to use internal elements (such as moving data within registers or calculating virtual or physical address locations), processor 11 may operate at a high internal operating clock frequency and also may request that system 10 provide a high value for the output voltage on output 14. The VID signals generally are digital signals that are coded in a digital format or code, such as a binary code, with each code representing a voltage value for the output voltage on output 14. Thus, the value of the VID signals indicates a voltage requirement. The power control system that includes controller 32, uses the VID signals to set the value of the output voltage on output 14.

Controller 32 receives the digital code from the VID signals and a converter 87 converts the digital signals to an analog signal through elements such as a digital-to-analog converter (DAC). Converter 87 receives the digital VID signals and forms an analog reference signal or Ref that is utilized by PWM control sections one through N as a reference voltage value for the PWM controllers within the PWM control sections. As the voltage required by processor 11 changes, the value of the code formed by the VID signals changes to request a higher or lower value of the output voltage on output 14. Controller 32 receives the VID signals and responsively increases or decreases the reference signal (Ref) thereby increasing or decreasing the value of the output voltage on output 14. The functionality of the VID signals and converter 87 to form the Ref signal and change the output voltage is well known to those skilled in the art.

Controller 32 also generally includes a first circuit or VID decode circuit 67, and a logic circuit 68 that receives the VID signals and uses the data encoded therein to assist in operating controller 32. In the preferred embodiment, VID decode circuit 67 includes logic that receives the VID signals and determines if the value of the code formed by the VID signals, thus the value of the VID signals, has increased or decreased. Circuits 67 and 68 are utilized to control the number of PWM channels that are operably supplying current and voltage to output 14 in order to improve the efficiency of system 10. The exemplary embodiment of logic circuit 68 includes a flip-flop 73, NOR gates 71 and 76, AND gate 74, OR gate 82, and inverter 70. As will be seen further hereinafter, an optional Enable control circuit or EN circuit 110 assists in providing controller 32 a capability to inhibit forming some of the plurality of PWM drive signals and increasing the efficiency provided by controller 32. In some embodiments, circuit 110 may be external to controller 32 with the output of circuit 110 connected to input 62.

Assume that at a time T0 (FIG. 2) processor 11 is executing instructions and operates the internal clock at a high frequency in order to execute the instructions in a rapid manner. During this time, the value of the code formed by the VID signals is high. Converter 87 receives the VID signals and responsively forms a high value for the Ref signal so that the output voltage value may be high.

Assume that at a time T1 (FIG. 2) processor 11 has completed operating the software code and is sitting in an idle state (such as executing a halt instruction) waiting for an interrupt or a time-out or some other event to re-initiate execution of software routines. Processor 11 internally senses this operational state and lowers the internal frequency as illustrated by graph 91. Because the internal operating status of processor 11 has gone to a low operational state, processor 11 also decreases the value of the code on the VID signals. Circuit 67 is configured to detect the decrease in the value of the VID signals and assert a down (DN) control signal that indicates the value of the VID signals have decreased. Circuit 67 forces the DN signal high responsively to detecting that the value of the VID signals has decreased. The high DN signal forces the clock input of flip-flop 73 high which clocks a logic high into flop 73 and forces the Q output high. Assuming that an enable (EN) input 62 is high and circuit 110 is omitted, the high Q output forces the output of gate 74 high. The high from gate 74 forces the output of gate 76 low thereby asserting a phase decrease (PD) signal. The low from gate 76 forces the output of drivers 45 and 46 low thereby inhibiting PWM channel N from generating PWM drive signals. Thus, at least one PWM channel of controller 32 is inhibited from forming PWM drive signals.

Controller 32 optionally includes a phase select input or select input 61 that is used to control the number of PWM channels that remain operating when the phase decrease (PD) control signal is asserted. If phase select input 61 is high, controller 32 keeps one PWM channel operating and forming PWM drive signals and if input 61 is low, controller 32 keeps two PWM channels operating and forming PWM drive signals. A high on input 61 forces the output of a buffer inverter 78 low. An optional test multiplexer or Mux 79 multiplexes the output of inverter 78 with a test bit that is utilized during a test mode to facilitate testing of controller 32. In the normal operating mode, the test mode select input of Mux 79 selects the output of inverter 78 to the input of gate 80. A select input into gate 80 is used to select a single phase operating mode or multiple phase operating mode. If the select input is low, controller 32 always uses a single channel. Assuming that the select input of gate 80 is high, the low from inverter 78 forces the output of gate 80 low thereby allowing the PD signal to force the output of gate 82 low. The low from gate 82 forces the output of drivers 41 and 42 low thereby inhibiting the second PWM channel from forming PWM drive signals. If select input 61 is low, the output of inverter 78 is high which forces the output of gates 80 and 82 high. The high from gate 82 enables drivers 41 and 42 to be driven by the PWM drive signals thereby preventing the PD signal from inhibiting the second PWM channel from generating PWM drive signals.

Assume that at a time T2, processor 11 again begins executing various instructions and increases the value of the VID signals. Circuit 67 detects the increase in the value of VID signals which forces the UP control signal high. The high from the UP control signal forces the output of gate 71 low which resets flop 73 thereby forcing the Q output low. The low Q output forces the output of gate 74 low. Assuming that a power save (PS) control input signal on a PS input 65 is high, the output of inverter 70 is low which allows the low from gate 74 to force the output of gate 76 high. The high from gate 76 forces the PD signal high to negate the PD signal as illustrated at time T2. The high from gate 76 enables drivers 45 and 46 to generate PWM drive signals on outputs 56 and 57 responsively to PWM signals generated by PWM controller N. The high from gate 76 also forces the output of gate 82 high thereby allowing drivers 41 and 42 to also form PWM drive signals responsively to the PWM signals generated by a PWM controller 40. If the VID signals increase again as illustrated at a time T3, there is no effect on circuits 67 or 68 because the UP control signal is already high.

If the VID signals decrease as illustrated at time T4, circuit 67 detects the decrease in value and forces the DN control signal high to again clock a logic high into flip-flop 73 and assert the PD control signal thereby inhibiting in least one of the plurality of PWM channels from generating PWM drive signals. Referring to FIG. 3, optional circuit 110 receives the current sense signals from the current sense inputs 50, 54, and 58 and sums them at via summing circuit 131 to generate a summed current sense signal (SCS). The summed current sense signal (SCS) is received by comparator 118. If the current used by processor 11 has not decreased, the value of the SCS signal would not decrease and would remain greater than some minimum valaue. Thus, comparator 118 compares the SCS signal to a reference signal received on a threshold (TH) input 96 and forces the EN signal low if the SCS signal is less than the minimum threshold value. The low EN signal allows controller to 32 to inhibit one of the plurality of PWM channels. Circuit 110 receives a threshold (Th) signal on an input 96 and forms a reference signal on a node 115 via a resistor divider of resistors 113 and 114. If the Select signal on input 61 is high, then the reference signal on node 115 is determined by resistor 113 in series with the parallel combination of resistors 114 and 112 due to transistor 111 being on. When the SCS signal is greater than reference signal set at node 115 by the Th signal and resistor divider 113, 114, and 112/111, the output of comparator 118 will be high. Assuming that optional transistor 122 and resistor 124 are omitted, then transistor 123 is conducting and the EN signal on the output of circuit 110 is low. The low EN signal pulls the EN signal to the value of return 66. The low EN signal prevents controller 32 from reducing the number of PWM channels in response to a reduction in the VID signals. Optional transistor 122 and resistor 124 are configured to receive a stop clock signal (STPCLK) from processor 11. The STPCLK signal is active low when the clocks of processor 11 are stopped internally to processor 11. The STPCLK signal going low turns off transistor 122 which prevents transistor 123 from pulling the EN signal low thereby enabling the EN signal with low latency in response to a STPCLK signal from processor 11. In an embodiment where circuit 110 is internal to controller 32, controller 32 would require an additional input (not shown) for receiving the STPCLK signal. Conversely, if the SCS is lower than the reference signal on node 115, then transistor 123 is disabled allowing resistor 125 to pull the EN signal high to the operating voltage on output 85 of regulator 84 (FIG. 1). The high EN signal enables controller 32 to reduce the number of operating channels in response to a reduction in the VID signals. If the value of the VID signals again decreases as illustrated at time T5 and assuming that the current required by processor 11 also decreases, circuit 110 forces the EN signal high and circuit 67 detects the decrease in value and forces the DN control signal high to again clock a logic high into flip-flop 73 to assert the PD control signal thereby inhibiting in least one of the plurality of PWM channels from generating PWM drive signals. As indicated hereinbefore, the state of optional input 61 determines how many PWM channels continue to form PWM drive signals.

Optional power save input 65 may be utilized to force controller 32 to inhibit forming at least one PWM drive signal independently of the state of the VID signals. Assume that the POR input is high only during a power-on reset time interval and is low during the normal operation of controller 32. If input 65 is low, the output of inverter 70 is high which forces the output of gate 76 low to assert the PD signal independently of the state of the VID signals. Thus, controller 32 inhibits least one PWM channel from forming PWM drive signals responsively to this control signal. When input 65 goes high, the output of inverter 70 is low which allows the state of the VID control signals, through the UP and DN control signals, to determine the number of PWM channels that form PWM drive signals. The low to high transition of input 65 forms a positive pulse from a one-shot 69 which forces the output of gate 71 low. The low from gate 71 resets latch 73 and forces the Q output low. The low from latch 73 forces the output of gate 74 low and the output of gate 76 high to force the Nth PWM to form drive signals. The high from gate 76 also forces the output of gate 82 high to force PWM 2 to form drive signals.

Those skilled in the art will appreciate that some processors generate a signal that indicates the processor has reached or exceed a maximum acceptable temperature for operating the processor. For some processors, the signal is called a PROCHOT signal. This signal is illustrated in FIG. 1 as a PHOT signal. In one embodiment, the PHOT signal may optionally connect to input 62 and to circuit 110 as illustrated by a dashed line. In such an embodiment, when the PHOT signal goes low, the output of gate 74 is forced low, thereby disabling the input of flip-flop 73 to gate 76 which prevents the VID transition from disabling the PWM outputs. In doing so, the PWM outputs are all forced back on, unless input 65 is asserted (low). This prevents controller 32 from running with reduced channels when processor 11 is running above its maximum temperature, which typically is a sign of heavy current drawing and also corresponds to the worst case leakage for integrated circuits. Causing controller 32 to inhibit forming some of the PWM drive signals reduces the amount of power losses that occur in those channels thereby improving the efficiency of system 10 during those times when processor 11 runs in a low power mode with significantly lower current draw and can operate with a reduced value of the output voltage. In one exemplary embodiment, causing a four phase PWM controller that is operating at five ampere (5 amp.) to reduce the number of PWM drive signals to one provided an efficiency improvement of at least twenty per cent (20%).

In order to provide this functionality for controller 32, regulator 84 is connected between input 59 and return 66. Output 85 is connected to provide operating power to various elements of controller 32 such as gates 71, 74, 76, converter 87, etc. Circuit 67 and converter 87 each have a plurality of inputs connected to a plurality of input terminals of controller 32 in order to receive control signals from processor 11. An analog reference output Ref of converter 87 is connected to a reference input of each of PWM controllers 36, 40, and 44. The UP control signal from circuit 67 is connected to a first input of gate 71 which has an output connected to a reset input of flip-flop 73. A second input of gate 71 is connected to the output of one-shot 69 which has an input connected to input 65 and to an input of inverter 70. An output of inverter 70 is connected to a first input of gate 76. A third input of gate 71 is connected to a power on reset (POR) input 64 of controller 32.

The DN control output of circuit 67 is connected to a clock input of flip-flop 73. A data (D) input of flip-flop 73 is connected to a logic high signal. The Q output of flip-flop 73 is connected to a first input of gate 74 which has an output connected to a second input of gate 76. A second input of gate 74 is connected to enable input 62. The output of gate 76 is commonly connected to an input of drivers 45 and 46 and to a first input of gate 82. An output of gate 82 is commonly connected to an input of drivers 41 and 42. Inverter 78 has an input connected to input 61 and an output connected to an input of Mux 79. A second input of Mux 79 is connected to receive a test-bit from a test circuit. A mode control input of Mux 79 is connected to a test mode control signal. An output of Mux 79 is connected to a first input of gate 80 which has an output connected to a second input of gate 82. A second input of gate 80 is connected to the select signal.

Figure 4:
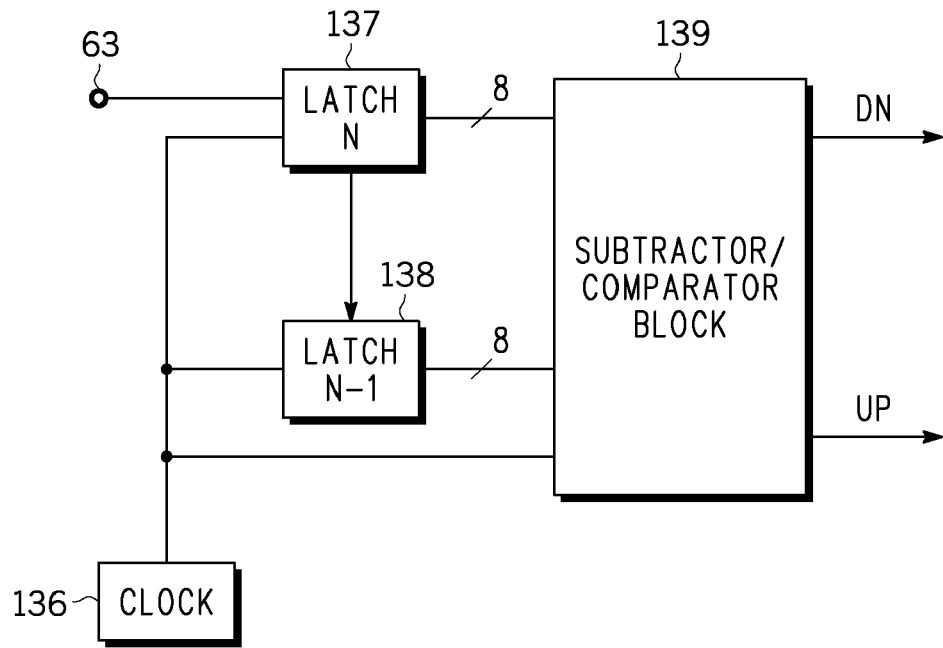
FIG. 4 schematically illustrates a block diagram of an exemplary embodiment of a portion of the efficient power supply controller of FIG. 1 in accordance with the present invention.

FIG. 4 schematically illustrates a portion of one exemplary block diagram embodiment of circuit 67 that was explained in the description of FIG. 1 and FIG. 2. Circuit 67 includes two latch registers 137 and 138 that are used to latch the state of the VID signals. Latch N register 137 is configured to store the current/most recent state of the VID signals while Latch N-1 register 138 represents a previously latched state of the VID signals. When the clock signal from clock 136 is asserted, a new read/latch event occurs into latch N register 137, and the previous states that were latched into register 137 are transferred to latch N-1 register 138 register. Thus, register 137 contains the current state of the VID signals and register 138 contains the previous state of the VID signals. The state of the VID signals in register 138 are subtracted from and compared to the new VID states that were latched into register 137. If the binary value of the new VID signals (in register 137) has increased (relative to the previous value in register 138), the UP signal is asserted and if the binary value of the new VID signals has decreased, the DN signal is asserted.

Figure 5:
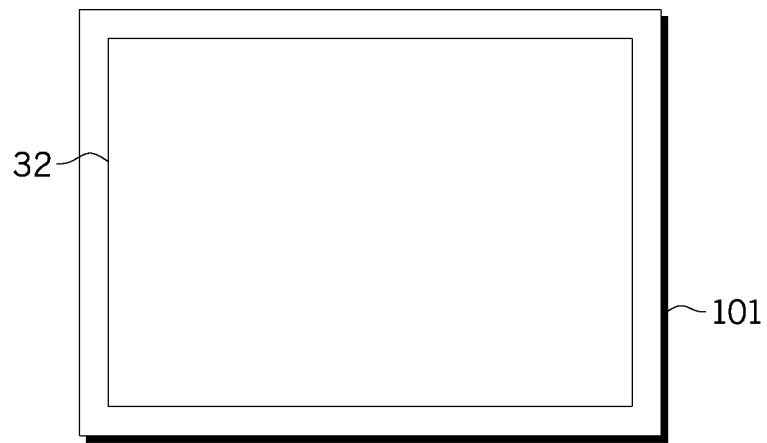
FIG. 5 schematically illustrates an enlarged plan view of a semiconductor device that includes the efficient power supply controller of FIG. 1 in accordance with the present invention.

FIG. 5 schematically illustrates an enlarged plan view of a portion of an embodiment of a semiconductor device or integrated circuit 100 that is formed on a semiconductor die 101. Controller 32 is formed on die 101. Die 101 may also include other circuits that are not shown in FIG. 4 for simplicity of the drawing. Controller 32 and device or integrated circuit 100 are formed on die 101 by semiconductor manufacturing techniques that are well known to those skilled in the art.

In view of all of the above, it is evident that a novel device and method is disclosed. Included, among other features, is configuring a multi-channel PWM controller to receive status signals and inhibit forming at least PWM drive signal of a plurality of PWM drive signals responsively to a decrease in the status signal.

While the subject matter of the invention is described with specific embodiments, it is evident that many alternatives and variations will be apparent to those skilled in the art. For example, although drivers 37, 38, 41, 42, 45, and 46 are illustrated as internal to controller 32 and transistors 17, 18, 21, 22, 25, and 26 are illustrated as external to controller 32, both the drivers and transistors may be either internal to or external to controller 32. Those skilled in the art will appreciate that drivers 42 and 46 may not be separate logic gates because logic within each PWM controller 36, 40, or 44 may provide other logic (in addition to the logic function of drivers 41, 42, 45, and 46). For example, the logic within each PWM controller 36, 40, and 44 may keep the bottom transistor enabled to more quickly reduce the value of the voltage on output 14. Additionally, the logic illustrated for circuits 67 and 68 is merely illustrative and may be replaced by other implementations that detect the change in the value of the status signal received on inputs 63 and responsively inhibit controller 32 from forming at least one PWM drive signal. Controller 32 may have more control inputs, such as input 61, to control the number of PWM drive signals that are inhibited.

The invention claimed is:

1. A power supply controller comprising:
a plurality of PWM circuits configured to form a plurality of PWM drive signals with each PWM circuit configured to form a PWM drive signal of the plurality of PWM drive signals to operate a power switch to regulate an output voltage to a desired value wherein each PWM drive signal is skewed in phase relative to other PWM drive signals of the plurality of PWM drive signals;
a reference circuit configured to form a reference signal;
a feedback input configured to receive a feedback signal that is representative of the output voltage wherein the plurality of PWM circuits use the feedback signal in a control loop and use the reference signal to control a duty cycle of the PWM drive signals;
a first circuit configured to receive a plurality of voltage requirement signals from a computer and responsively form a first control signal indicating one of an increase or decrease in voltage required by the computer, and configured to form a second signal indicating different one of the increase or decrease in voltage required by the computer; and
a logic circuit configured to receive the first control signal and inhibit forming at least one PWM drive signal of the plurality of PWM drive signals responsively to the first control signal indicating a decrease in voltage required by the computer and independently of the value of the feedback signal, and further including the logic circuit configured to subsequently re-enable the formation of the at least one PWM drive signal of the plurality of PWM drive signals responsively to the second control signal.

2. The power supply controller of claim 1 further including a second circuit configured to receive the plurality of voltage requirement signals and form an analog signal indicating a requirement to increase or decrease a value of the output voltage.

3. The power supply controller of claim 2 wherein the second circuit includes a digital to analog converter to convert a value of the plurality of voltage requirement signals to an analog signal used to adjust a value of the output voltage independently of the first circuit.

4. The power supply controller of claim 1 further including the power supply controller configured to receive an input control signal and to responsively disable at least one PWM drive signal of the plurality of PWM drive signals responsively to a negated state of the input control signal independently of a state of the first control signal.

5. The power supply controller of claim 4 wherein the first circuit includes digital logic to sense the plurality of voltage requirement signals increasing in value.

6. The power supply controller of claim 1 wherein the first circuit includes a decode circuit configured to receive the plurality of voltage requirement signals, decode the signals, and form the first and second control signals responsively to values of the plurality of voltage requirement signals.

7. The power supply controller of claim 6 wherein the decode circuit includes a plurality of storage elements to store sequential states of the plurality of voltage requirement signals and also includes a circuit to compare new states of the plurality of voltage requirement signals to stored states and responsively form the first and second control signals.

8. A method of forming a power controller comprising:
configuring a plurality of PWM circuits to form a plurality of PWM drive signals with each PWM circuit configured to form a PWM drive signal to operate a power switch to regulate an output voltage to a desired value wherein each PWM drive signal is skewed in phase relative to other PWM drive signals of the plurality of PWM drive signals;
configuring the power controller to receive a sense signal that is one of a feedback signal that is representative of a value of the output voltage or a current sense signal that is representative of a value of current supplied to a load that receives the output voltage;
configuring the power controller to receive a plurality of status signals having a value and assert a first control signal responsively to a combination of both independently of a value of the feedback signal and a decrease in the value of the status signals and further including configuring the power controller to assert a second control signal responsively to a combination of both an increase in the value of the status signals and independently of a value of the feedback signal wherein the plurality of status signals are received from a computer external to the power controller and are representative of a voltage requirement of the computer; and
configuring the power controller to inhibit forming at least one PWM drive signal responsively to the first control signal and to subsequently re-enable the at least one PWM drive signal responsively to the second control signal.

9. The method of claim 8 wherein configuring the power controller to inhibit forming at least one PWM drive signal includes configuring the power controller to inhibit forming all but one PWM drive signal of the plurality of PWM drive signals.

10. The method of claim 8 further including configuring the power controller to receive a phase control input signal having a value that is representative of a number of the plurality of PWM drive signals to not inhibit.

11. The method of claim 10 wherein. configuring the power controller to inhibit forming the at least one PWM drive signal includes configuring the power controller to inhibit forming all PWM drive signals except the number of the plurality of PWM drive signals.

12. The method of claim 8 further including configuring the power controller to receive a third control signal and inhibit forming the at least one PWM drive signal responsively to the third control signal independently of a state of the first control signal.

13. A method of forming a power controller comprising:
configuring a plurality of PWM circuits to form a plurality of PWM drive signals with each PWM circuit configured to form a PWM drive signal to operate a power switch to regulate an output voltage to a desired value wherein each PWM drive signal is skewed in phase relative other PWM drive signals of the plurality of PWM drive signals;
configuring the power controller to receive a feedback signal that is representative of the output voltage;
configuring the power controller to receive a plurality of status signals from a load wherein the plurality of status signals are representative of a voltage required by the load and are devoid of a single signal indicating a low power operating mode of the load;
configuring the power controller to convert the plurality of status signals to a first control signal and to control a duty cycle of the plurality of PWM drive signals responsively to the control signal and the feedback signal; and configuring the power controller to decode a value of the plurality of status signals and inhibit forming at least one PWM drive signal of the plurality of PWM drive signals responsively to a combination of both the value of the plurality of status signals and independently of a value of the feedback signal and further including configuring the power controller to subsequently re-enable forming the at least one PWM drive signal responsively to a combination of both a change in the value of the plurality of status signals and independently of a value of the feedback signal.

14. The method of claim 13 wherein configuring the power controller to receive the plurality of status signals includes configuring the power controller to receive the plurality of status signals and responsively inhibit forming the at least one PWM drive signal responsively to a decrease in the value.

15. The method of claim 13 wherein configuring the power controller to receive the plurality of status signals includes configuring the power controller to inhibit forming all but one PWM drive signal of the plurality of PWM drive signals.

16. The method of claim 13 wherein configuring the power controller to receive the plurality of status signals includes configuring the power controller to inhibit forming all but a portion of the PWM drive signals of the plurality of PWM drive signals.

17. The method of claim 16 wherein configuring the power controller to inhibit forming all but the portion of the PWM drive signals of the plurality of PWM drive signals includes forming the portion to be less than all of the plurality of PWM drive signals and more than one PWM drive signal.

18. The power supply controller of claim 13 wherein the plurality of voltage requirement signals are voltage identification signals that are devoid of the single signal indicating the low power operating mode and wherein the plurality of voltage identification signals are devoid of a signal that solely indicates a sleep operating mode of the load.

* * * * *